United States Patent
Hikita

(10) Patent No.: US 8,820,371 B2
(45) Date of Patent: Sep. 2, 2014

(54) MOTORCYCLE TIRE FOR RUNNING ON ROUGH TERRAIN

(75) Inventor: Masahiro Hikita, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 370 days.

(21) Appl. No.: 13/183,692

(22) Filed: Jul. 15, 2011

(65) Prior Publication Data

US 2012/0018067 A1    Jan. 26, 2012

(30) Foreign Application Priority Data

Jul. 26, 2010 (JP) .................. 2010-167450

(51) Int. Cl.
*B60C 11/11* (2006.01)
*B60C 11/13* (2006.01)

(52) U.S. Cl.
CPC ............. *B60C 11/11* (2013.01); *B60C 11/1369* (2013.01); *B60C 2200/14* (2013.01); *B60C 2200/10* (2013.01)
USPC ................ 152/209.11; 152/209.8; 152/209.6; 152/209.17; 152/209.22

(58) Field of Classification Search
USPC .................. 152/209.11, 209.8, 209.9, 209.16, 152/209.17, 209.22, 902; D12/536, 571, D12/579
IPC ........................................................ B60C 11/11
See application file for complete search history.

(56) References Cited

U.S. PATENT DOCUMENTS

| 4,311,179 A | * | 1/1982 | Hayakawa et al. ...... 152/209.11 |
| 6,796,350 B1 | * | 9/2004 | Gerresheim et al. ........ 152/209.9 |
| 2008/0110542 A1 | * | 5/2008 | Sueishi ..................... 152/209.25 |

FOREIGN PATENT DOCUMENTS

| JP | 61009316 A | * | 1/1986 | ............. B60C 11/11 |
| JP | 2-74405 A | | 3/1990 | |
| JP | 6-320916 A | | 11/1994 | |
| JP | 2799010 B2 | * | 9/1998 | ............. B60C 11/04 |
| JP | 2874782 B2 | * | 3/1999 | ............. B60C 11/11 |
| JP | 2005193784 A | * | 7/2005 | ............. B60C 11/04 |

* cited by examiner

*Primary Examiner* — Justin Fischer
*Assistant Examiner* — Philip N Schwartz
(74) *Attorney, Agent, or Firm* — Birch, Stewart, Kolasch & Birch, LLP

(57) ABSTRACT

A motorcycle tire for running on rough terrain comprises a tread portion having a developed tread width and provided with a plurality of tread blocks. The tread blocks include a plurality of crown blocks defined as having a ground contacting top surface whose centroid is located within a crown region defined as having a developed width of ⅓ of the developed tread width and centered on the tire equator. The crown blocks include a plurality of central crown blocks whose axial distance from the tire equatorial plane to the centroid is not more than 2% of the developed tread width, and a plurality of off-center crown blocks whose axial distance from the tire equatorial plane to the centroid is more than 2% and not more than 6% of the developed tread width.

17 Claims, 7 Drawing Sheets

MOTORCYCLE TIRE FOR RUNNING ON ROUGH TERRAIN

BACKGROUND OF THE INVENTION

The present invention relates to a pneumatic tire, more particularly to a motorcycle tire having a tread pattern suitable for running on rough terrain and capable of improving cornering performance and traction performance during straight running.

Motorcycle tires designed for use in motocross race and the like are usually provided in the tread portion with crown blocks disposed on the tire equator, shoulder blocks disposed along the tread edges and middle blocks therebetween so that the tread blocks dig into soft ground such as sandy and muddy areas to improve the traction performance and cornering performance.

In order to improve the cornering performance of such motorcycle tire, in Japanese Patent Application Publication No. 2-74405, axially outside corners of middle blocks are chamfered so that axially inside edges of shoulder blocks located on the axially outside thereof are improved in the ground contact and thereby the cornering performance is improved.

In Japanese Patent Application Publication No. 6-320916, axially inside corners of middle blocks are stepped so that the steps provides additional edges which can contact with the ground during cornering and thereby can improve the cornering performance.

In the techniques described in the above-mentioned publications, however, the effect to improve the cornering performance essentially depends on the edges of the tread blocks. Accordingly, when the edges are worn away, the effect to improve the cornering performance also fades away.

SUMMARY OF THE INVENTION

It is therefore, an object of the present invention to provide a motorcycle tire suitable for running on rough terrain, in which, by improving the arrangement of blocks, the cornering performance and traction performance during straight running can be improved, and the improved cornering performance can be maintained.

According to the present invention, a motorcycle tire comprises a tread portion having a developed tread width and provided with a plurality of tread blocks defining a sea area therearound, the tread blocks including a plurality of crown blocks defined as having a ground contacting top surface whose centroid is located within a crown region defined as having a developed width of ⅓ of the developed tread width and centered on the tire equator, wherein the crown blocks include a plurality of central crown blocks whose axial distance from the tire equatorial plane to the centroid is not more than 2% of the developed tread width, and a plurality of off-center crown blocks whose axial distance from the tire equatorial plane to the centroid is more than 2% and not more than 6% of the developed tread width.

Therefore, the ground contacting top surfaces of the crown blocks are spread widely in the widthwise direction of the tread, and the crown blocks can make a contribution to the traction performance during straight running as well as cornering with camber angles. Thereby, the cornering performance can be improved.

In this application including specification and claims, unless otherwise noted, the term "distance" (e.g. axial distance), the term "width" (e.g. axial width), the term "length" (e.g. circumferential length) mean measurements along the tread surface under the normally inflated unloaded state of the tire.

The developed tread width means a distance measured perpendicularly to the tire equator from one of the tread edges to the other along the tread surface.

The normally inflated unloaded state is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure is the maximum air pressure specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like.

DESCRIPTION OF THE PREFERRED EMBODIMENTS

Figure 1:
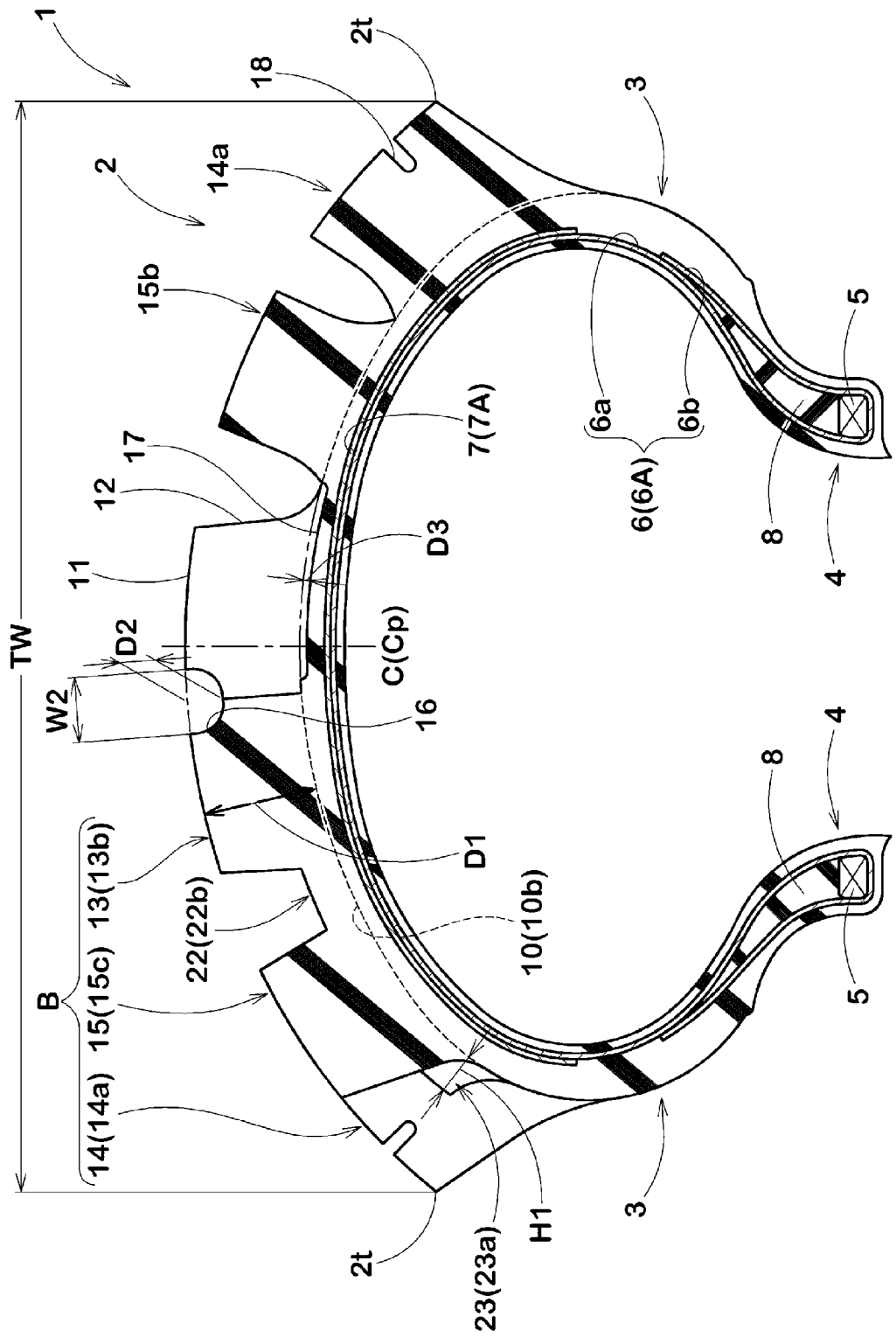
FIG. 1 is a cross sectional view of a motorcycle tire for running on rough terrain according to an embodiment of the present invention.

Embodiments of the present invention will now be described in detail in conjunction with accompanying drawings.

In the drawings, motorcycle tire 1 according to the present invention comprises a tread portion 2 having tread edges 2t, a pair of bead portions 4 with a bead core 5 therein, a pair of sidewall portions 3 extending between the tread edges and bead portions, a carcass 6 extending between the bead portions 4 through the tread portion 2 and sidewall portions 3, and a tread reinforcing layer 7 disposed radially outside the carcass 6 in the tread portion 2.

The tread portion 2 is curved convexly so that the maximum cross section width TW of the tire lies between the tread edges 2t as shown in FIG. 1. In FIG. 1, there is shown a cross section of the tire 1 taken along a line A-A of FIG. 2A under the normally inflated unloaded state.

The carcass 6 is composed of one or more, in this example, only one ply 6A of carcass cords extending between the bead portions 4 through the tread portion 2 and sidewall portions 3 and turned up around the bead core 5 in each of the bead portions 4 from the inside to the outside of the tire so as to form a pair of carcass ply turned up portions 6b and a carcass ply main portion 6a therebetween. In this example, organic fiber cords are used as the carcass cords.

The carcass 6 in this example is of a radial structure, and the carcass cords in the carcass ply 6A are arranged radially at an angle of from 75 to 90 degrees with respect to the tire circumferential direction. It is however, also possible that the carcass 6 has a bias structure. Namely, the carcass 6 comprises at least two cross plies of carcass cords arranged obliquely, for example, at angles of 15 to 45 degrees with respect to the tire circumferential direction.

Meanwhile, between the carcass ply main portion 6a and turned up portion 6b in each of the bead portions, there is disposed a bead apex 8 made of a hard rubber compound extending radially outwardly from the radially outside of the bead core 5 in order to reinforce the bead portion 4 and a sidewall lower portion.

The above-mentioned tread reinforcing layer 7 is composed of one or more, in this example, only one ply 7A of reinforcing cords laid at an inclination angle of from 15 to 45 degrees with respect to the tire circumferential direction. In this example, organic fiber cords are used as the reinforcing cords.

Figure 2A:
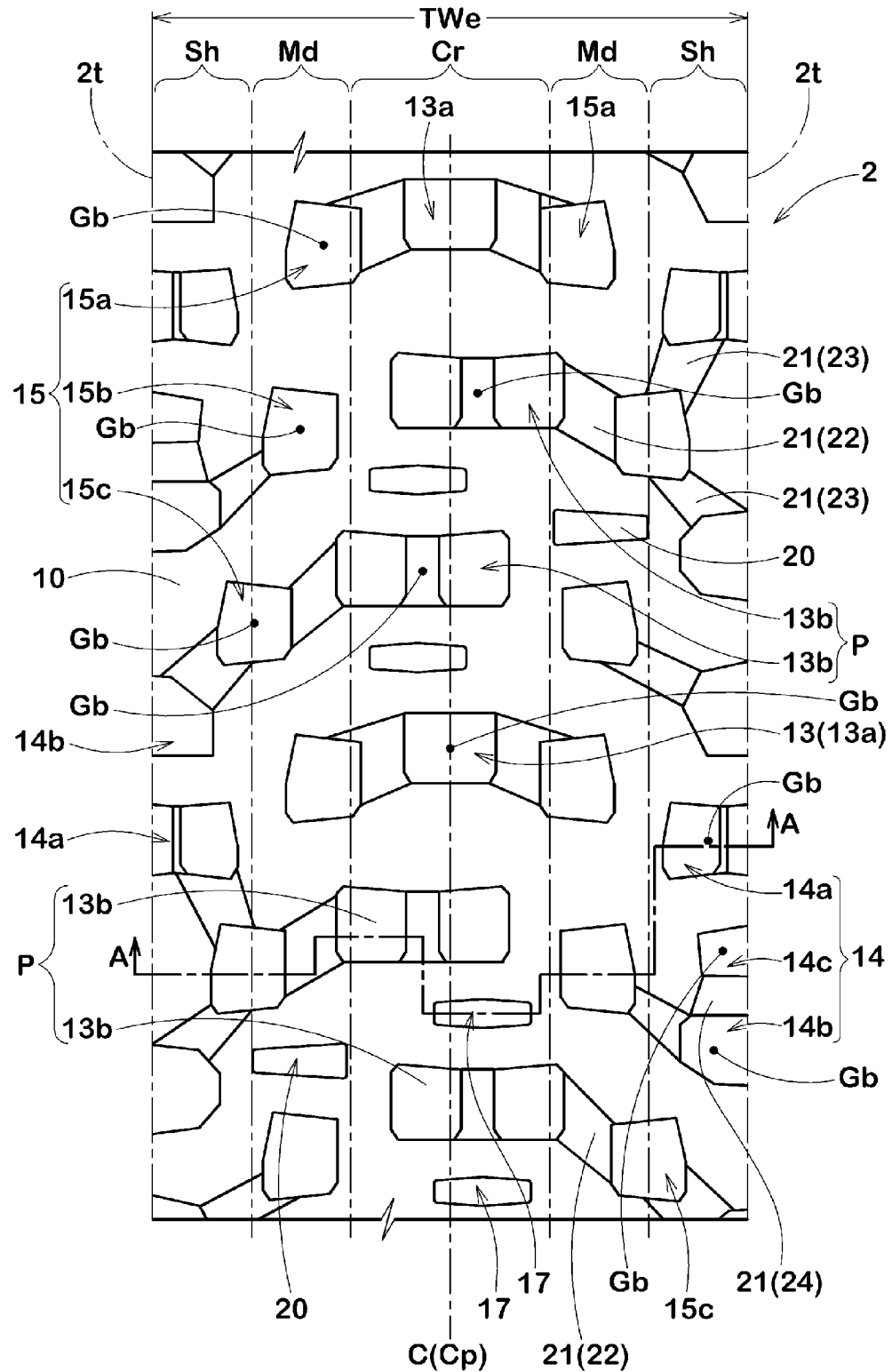
FIG. 2A is a developed partial view of the tread portion of the tire shown in FIG. 1.
Figure 2B:
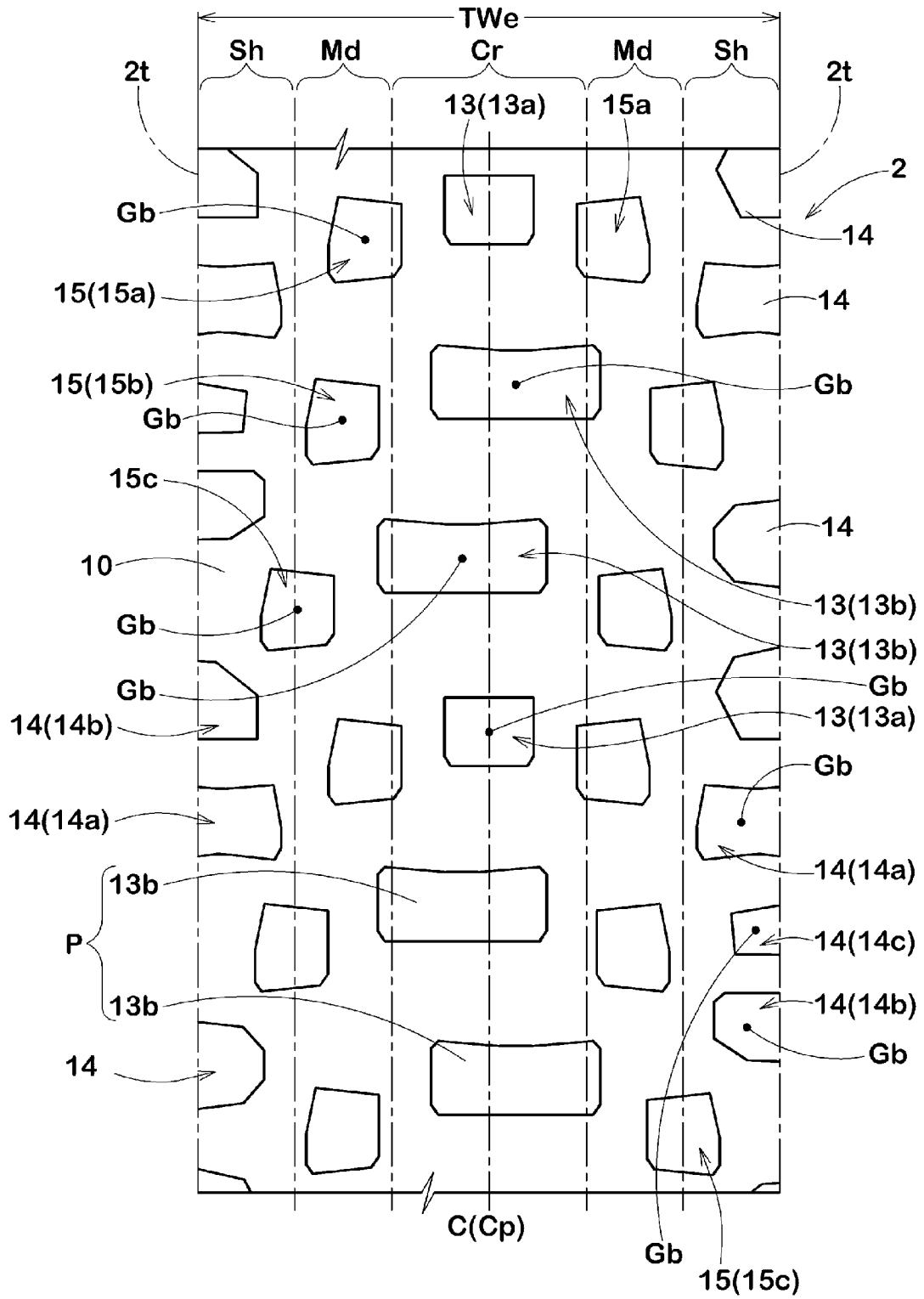
FIG. 2B is the same as FIG. 2A except that only the tread blocks are depicted and optional depressions, slots and tie bars are omitted.

FIG. 2A shows a practical-type example based on the tread pattern shown in FIG. 2B which shows a basic example according to the present invention. The example shown in FIG. 2A is designed for use in motocross races so as to bring out maximum performance on soft ground such as sandy area and muddy area.

The tread portion 2 is provided with a plurality of blocks B separated from each other by tread grooves 10.

As shown in FIG. 2B, the tread blocks B are arranged sparsely when compared with tires in other categories such as passenger car tires, and preferably the land ratio (Sb/S) is set in a range of from 15 to 30%.

Given that each block B has a ground contacting top surface 11 contacting with the ground, and a side surface 12 extending radially inwardly from the peripheral edge of the ground contacting top surface 11 towards the bottom 10b of the tread grooves, the land ratio (Sb/S) is defined by a ratio of the total area Sb of the ground contacting top surfaces 11 of all of the tread blocks B to the gross area S of the tire tread (namely, the area of the radially outer surface of the tread portion 2 including the grooved area).

As the tread grooves 10 are very broad and have complex shapes when compared with a passenger car tire and the like, the grooved area of the tread portion is hereinafter referred to as "sea area 10".

The bottom 10b of the sea area 10 extends substantially parallel with the radially outer surface of the carcass 6, excepting the undermentioned optional depressions 17 and 20.

The tread blocks B have a height D1 in a range of about 6 to 19 mm. The height D1 is the radial measurement from the ground contacting top surface 11 to the bottom 10b, accordingly equal to the depth of the sea area 10.

Therefore, the tread blocks B can efficiently dig into the soft grounds and produce a larger traction. Further, as the sea area 10 is wide, the mud compressed between the tread blocks can be easily self-ejected during tire revolution. If the land ratio (Sb/S) is more than 30%, the traction on the soft grounds becomes insufficient. If the land ratio (Sb/S) is less than 15%, the traction becomes insufficient on the hard and medium grounds.

As shown in FIG. 2B, the tread blocks B include
crown blocks 13 disposed in a crown region Cr,
shoulder blocks 14 disposed in shoulder regions Sh and
middle blocks 15 disposed in middle regions Md.

More specifically, the crown block 13 is defined such that the centroid Gb of the ground contacting top surface 11 thereof is located in the crown region Cr.

The shoulder block 14 is defined such that the centroid Gb of the ground contacting top surface 11 thereof is located in the shoulder region sh.

The middle block 15 is defined such that the centroid Gb of the ground contacting top surface 11 thereof is located in the middle region Md.

The crown region Cr is defined as centered on the tire equator C and having a developed width of ⅓ of the developed tread width TWe.

The shoulder regions sh are each defined as extending axially inwardly from one of the tread edges 2t and having a developed width of ⅙ of the developed tread width TWe.

The middle regions Md are defined between the shoulder regions Sh and the crown region Cr.

Crown Blocks

The crown blocks 13 include
central crown block 13a defined such that the axial distance L1 from the tire equatorial plane Cp to the centroid Gb thereof is not more than 2% of the developed tread width TWe, and off-center crown block 13b defined such that the axial distance L2 (L2a to the right/L2b to the left) from the tire equatorial plane Cp to the centroid Gb thereof is more than 2% and not more than 6% of the developed tread width TWe. All of the crown blocks 13 are crossed by the tire equator.

The central crown block 13a is formed so as to have the ground contacting top surface 11 which is substantially rectangular and longer in the tire axial direction than in the tire circumferential direction. Namely, the maximum axial width W3 is larger than the maximum circumferential length L3. Preferably, the maximum circumferential length L3 is about 70 to 80% of the maximum axial width W3 which is about 10 to 20% of the developed tread width TWe.

The off-center crown block 13b is also formed so as to have the ground contacting top surface 11 which is substantially rectangular and longer in the tire axial direction than in the tire circumferential direction. Namely, the maximum axial width W4 is larger than the maximum circumferential length L4. Preferably, the maximum circumferential length L4 is about 35 to 45% of the maximum axial width W4 which is about 20 to 30% of the developed tread width TWe. Therefore, the off-center crown block 13b is axially longer than the central crown block 13a.

By employing such axially-long shapes in the crown blocks 13a and 13b, the axial component of the block edges is increased, and the traction performance can be improved. Therefore, owing to the central crown blocks 13a and wide off-center crown blocks 13b, a large traction or road grip can be obtained from zero camber angle to small camber angles, in other words, from straight running to an initial stage of cornering, and thereby the cornering performance can be improved.

Preferably, the maximum axial width W4 of the off-center crown blocks 13b is not less than 150%, more preferably not less than 180% of the maximum axial width W3 of the central crown blocks 13a. However, if the maximum axial width W4 of the off-center crown blocks 13b is too large, as the circumferential component of the block edges is relatively decreased, there is a possibility that the cornering performance is deteriorated. Therefore, it is preferable that the maximum axial width W4 of the off-center crown blocks 13b is not more than 200%, more preferably not more than 190% of the maximum axial width W3 of the central crown blocks 13a.

In order to further improve the cornering performance, it is preferred that the total number TLs of the off-center crown blocks 13b is more than the total number TLc of the central crown blocks 13a. Especially, it is preferable that the total number TLs is not less than 1.5 times, more preferably not less than 2 times the total number TLc. However, if the off-center crown blocks 13b are too many, there is a possibility that the traction performance during straight running deteriorates. Therefore, the total number TLs of the off-center crown blocks 13b is preferably not more than 2.5 times, more preferably not more than 2.2 times the total number TLc of the central crown blocks 13a.

In this embodiment, the total number TLs of the off-center crown blocks 13b is two times the total number TLc of the central crown blocks 13a.

As shown in FIG. 2B, it is preferred that a pair (P) of the off-center crown blocks 13b are disposed between every two of the circumferentially adjacent central crown blocks 13a, and the centroids Gb of the paired off-center crown blocks 13b are respectively located on one side and the other side of the tire equator in order to balance the cornering grip performance between right turn and left turn.

As a result, the number of the off-center crown blocks 13b on the right side of the tire equator becomes equal to the number of the off-center crown blocks 13b on the left side of the tire equator and also equal to the total number TLC of the central crown blocks 13a.

Figure 3:
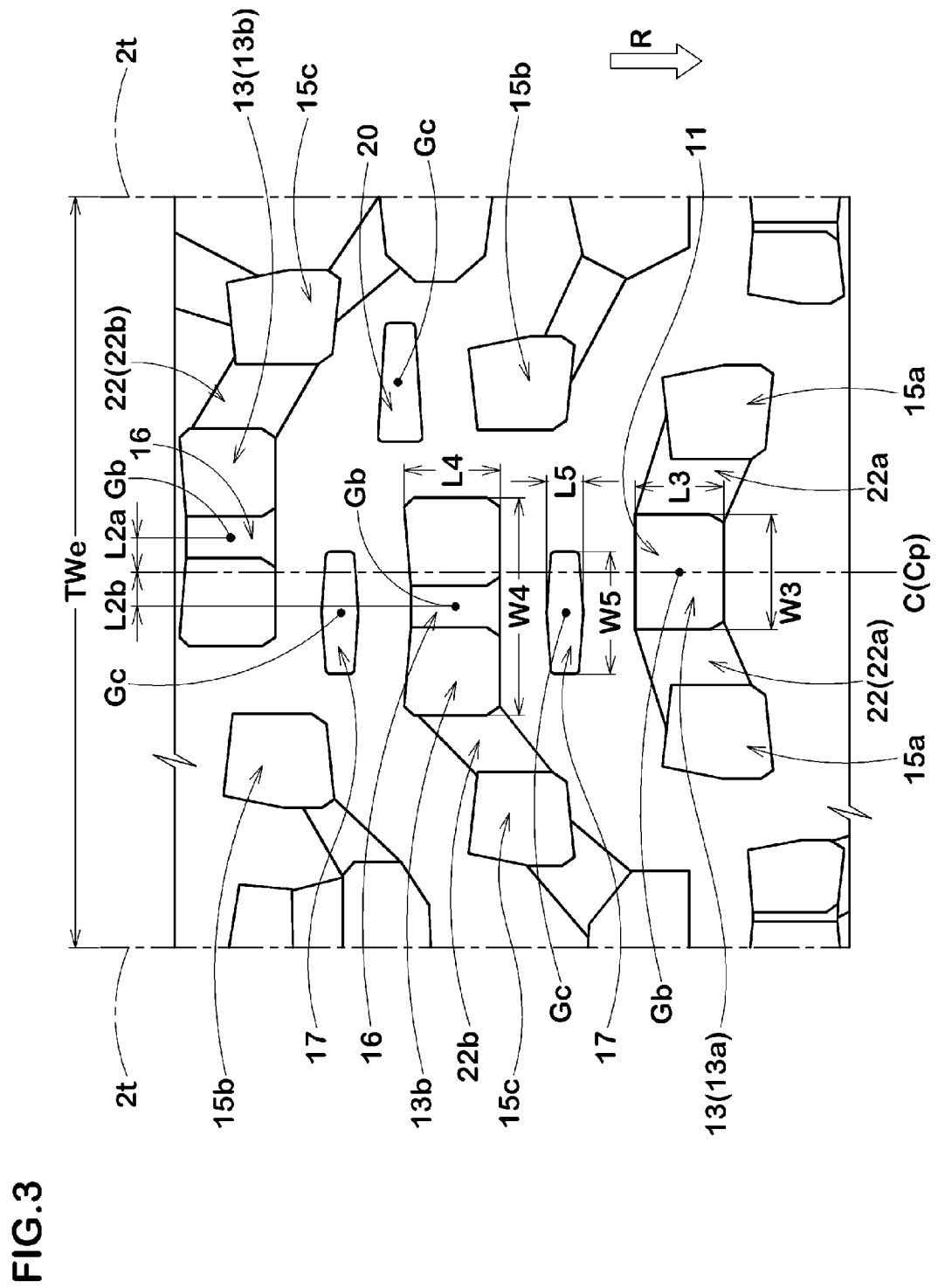
FIG. 3 and FIG. 4 are developed partial views of the tread portion of the tire shown in FIG. 1 for detailing the arrangements of the tread blocks.

In this case, the axial distance L2a of the right-side off-center crown blocks 13b is set to be equal to the axial distance L2b of the left-side off-center crown blocks 13b as shown in FIG. 3. (L2a=L2b) However, the axial distances L2a and L2b may differ from each other, if needed. Further, it is not always necessary that the axial distances L2a and L2b have one value or two different values. For example, in order to spread the off-center crown blocks 13b widely in the tire axial direction and thereby to improve the traction during straight running and the cornering performance in a well balanced manner, the axial distances L2a and L2b may have three or values.

In order to increase the ground contacting area and the block edges existing in the foot print of the tire during straight running and thereby to increase the traction, it is preferred that every two of the off-center crown blocks 13b which are circumferentially adjacent to each of the central crown blocks 13a are located on the same side of the tire equator C.

Shoulder Blocks

The shoulder blocks 14 include first shoulder blocks 14a, second shoulder blocks 14b and third shoulder blocks 14c.

The first shoulder block 14a is formed so as to have the ground contacting top surface 11 which is an axially-long rectangular shape, and the maximum axial width W6 is larger than the maximum circumferential length L6 so as to increase the axial components of the block edges in order to improve the traction during cornering. Preferably, the maximum circumferential length L6 is about 80 to 90% of the maximum axial width W6 which is about 12 to 16% of the developed tread width TWe.

The second shoulder block 14b is formed so as to have the ground contacting top surface 11 which is a polygonal shape, and the maximum circumferential length L7 is substantially same as the maximum axial width W7 to secure the axial components of the block edges. Preferably, the maximum circumferential length L7 is about 90 to 100% of the maximum axial width W7 which is about 9 to 12% of the developed tread width TWe.

The third shoulder block 14c is formed so as to have the ground contacting top surface 11 which is a substantially rectangular shape smaller than the second shoulder block 14b.

Middle Blocks

The middle blocks 15 are
axially innermost middle blocks 15a whose distance L9 from the tire equatorial plane Cp to the centroid Gb is smallest,
axially outermost middle blocks 15c whose distance L11 from the tire equatorial plane Cp to the centroid Gb is largest, and
in-between middle blocks 15b whose distance L10 from the tire equatorial plane Cp to the centroid Gb is more than the distance L9 and less than the distance L11.

In each of the middle blocks 15a, 15b and 15c, preferably, the maximum axial width W12 is about 10 to 15% of the developed tread width TWe, and the maximum circumferential length L12 is about 100 to 120% of the maximum axial width W12.

In order to disperse the ground contacting top surfaces 11 of the middle blocks 15 widely in the tire axial direction and thereby to improve the cornering performance, it is preferred that the distance L9 is at most 22% of the developed tread width TWe, the distance L11 is at least 32% of the developed tread width TWe, and the distance L10 is a range of more than 23% and less than 30% of the developed tread width TWe.

Depressions

As shown in FIG. 2A, the above-mentioned bottom 10b of the sea area 10 can be provided with depressions 17, 20.

Between the circumferentially adjacent crown blocks 13, there are disposed crown depressions 17 having an axially-long generally-rectangular opening shape. Preferably, the crown depressions 17 has a maximum depth D3 of about 0.5 to 1.5 mm, a maximum axial width W5 of about 15 to 20% of the developed tread width TWe, and a maximum circumferential length L5 of about 10 to 40% of the maximum axial width W5.

The crown depressions 17 decrease the rigidity of the tread portion around the crown blocks 13. Therefore, shocks received by the rider during running can be mitigated. Further, as the rigidity of the portion surrounding the crown block 13 is decreased, when the crown block 13 contact with the ground, the crown block 13 can move to increase the ground contacting area. As a result, the traction during straight running and the cornering performance can be improved.

For this reason, in the case of the crown depression 17 disposed adjacent to the off-center crown block 13b, it is preferable that the centroid Gc of the opening shape of the crown depression 17 and the centroid Gc of the off-center crown block 13b are located on the same side of the tire equatorial plane Cp. Further, it is preferable that one crown depression 17 is disposed on each side, in the tire circumferential direction, of the off-center crown block 13b.

Further, on the axially outside of the off-center crown blocks 13b, side-depressions 20 can be disposed.

The side-depressions 20 have an axially-long trapezoidal opening shape tapering towards the axially outside. Therefore, when the off-center crown blocks 13b are subjected to lateral force during cornering, as the side-depressions 20 decrease the stiffness, the off-center crown block 13b can move to improve the ground contact.

Tie Bars

As shown in FIG. 2A, it is possible to connect the tread blocks 13, 14 and 15 one another through tie bars 21 having a height H1 (from the bottom 10b) of about 25 to 35% of the above-mentioned height D1 of the tread blocks B. Therefore, the tread blocks can be increased in the stiffness in the axial direction and/or circumferential direction, and thereby it is possible to greatly improve the traction performance during straight running and cornering performance.

In this example, the tie bars 21 include crown tie bars 22 connecting between the crown blocks 13 and middle blocks 15, middle tie bars 23 connecting between the middle blocks 15 and shoulder blocks 14, and shoulder tie bars 24 connecting between the circumferentially adjacent shoulder blocks 14.

The crown tie bars 22 include
first crown tie bars 22a connecting between the central crown blocks 13a and the middle blocks 15, and
second crown tie bars 22b connecting between the off-center crown blocks 13b and the middle blocks 15.

Each of the central crown blocks 13a is connected to two of the axially innermost middle blocks 15a which are disposed one on each side of the central crown block 13a in the tire axial direction through two first crown tie bars 22a.

The two first crown tie bars 22a extend from the central crown block 13a to the axially innermost middle blocks 15a, while inclining to one circumferential direction and maintaining a constant circumferential length which is substantially same as the maximum circumferential length L3 of the central crown block 13a in order to increase the stiffness of the central crown block 13a towards both sides in the axial direction in a well balanced manner, therefore, the cornering performance can be further improved.

Each of the off-center crown blocks 13b is connected to one of the axially outermost middle blocks 15c of which centroid Gb is located on the same side of the tire equator as the centroid Gb of the off-center crown block 13b concerned, through the second crown tie bar 22b inclined with respect to the axial direction.

Such second crown tie bar 22b increases the stiffness in the tire axial direction of the off-center crown block 13b mainly contacting with the ground during cornering, therefore it becomes possible to improve the cornering performance.

It is preferable that the first and second crown tie bars 22a and 22b are inclined to the designed intended rotation direction R of the tire 1 from the axially inside towards the axially outside.

The middle tie bars 23 include
first middle tie bars 23a connecting between the axially outermost middle blocks 15c and the shoulder blocks 14,
second middle tie bars 23b connecting between the axially outermost middle block 15c and the shoulder blocks 14, and
third middle tie bars 23c connecting between the in-between middle blocks 15b and the shoulder blocks 14.

The first middle tie bar 23a extends from the axially outermost middle block 15c to the first shoulder block 14a reverse taperingly, while inclining to the opposite circumferential direction to the crown tie bar 22.

The second middle tie bar 23b extends from the axially outermost middle block 15c to the second shoulder block 14b reverse taperingly, while inclining to the same circumferential direction as the crown tie bar 22.

In this example, the above-mentioned axially outermost middle blocks 15c include one connected by three tie bars which are the second crown tie bar 22b, first middle tie bar 23a and second middle tie bar 23b, and one connected by toe tie bars which are the second crown tie bar 22b and second middle tie bar 23b.

Figure 4:
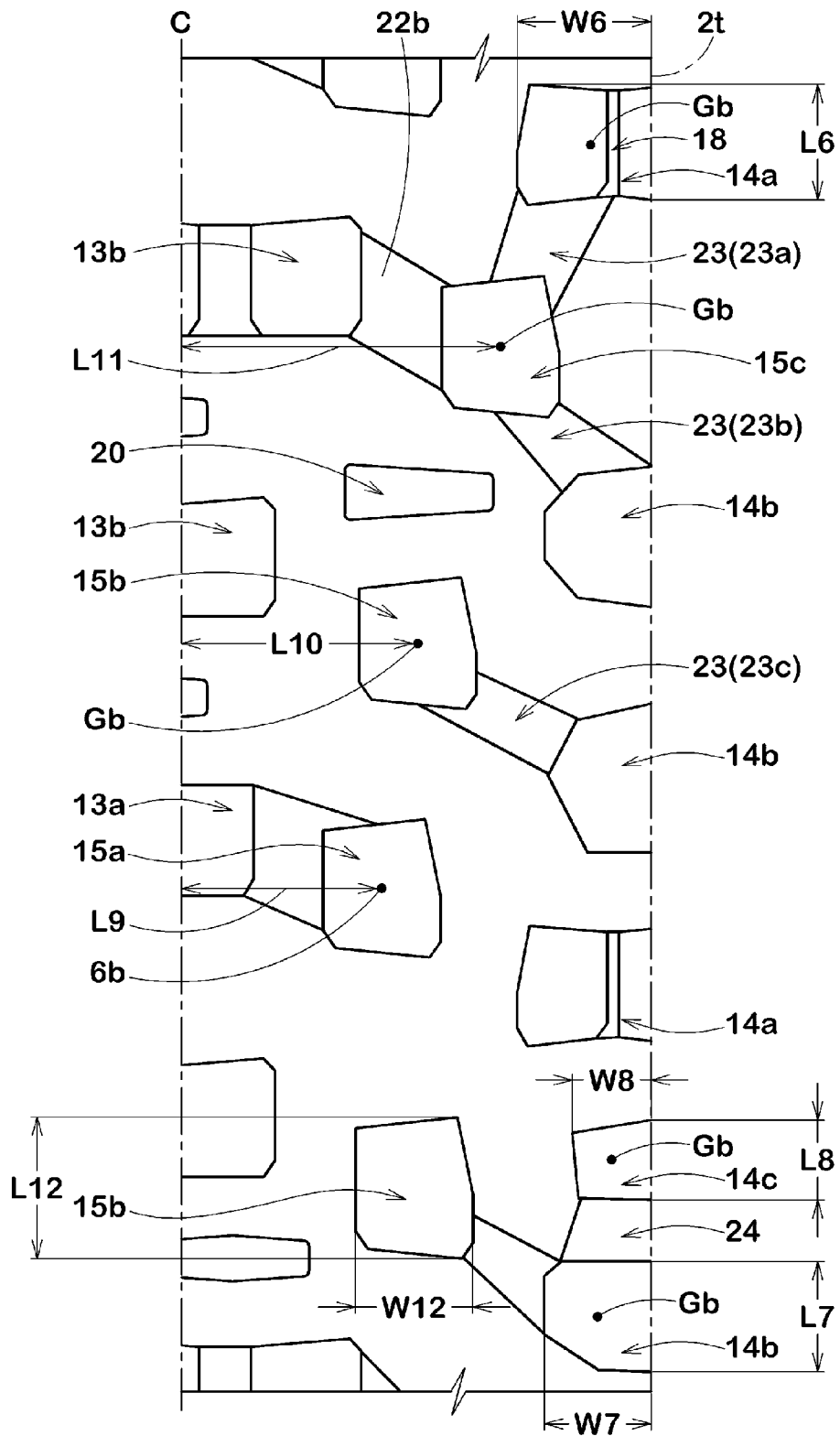

As shown in FIG. 4, in cooperation with the second crown tie bar 22b, the first and second middle tie bars 23a and 23b can increase the axial rigidity of the connected blocks and can greatly improve the cornering performance.

When the first and second middle tie bars 23a and 23b are connected to one axially outermost middle block 15c, the outward lateral force applied to the middle block 15c can be dispersed to the first and second shoulder blocks 14a and 14b, and the axially outermost middle block 15c and the first and second shoulder blocks 14a and 14b are connected in the tire circumferential direction. Therefore, the axial rigidity and circumferential rigidity of the connected blocks can be effectively increased.

The third middle tie bar 23c extends from the in-between middle block 15b to the second shoulder block 14b reverse taperingly, while inclining to the same circumferential direction as the crown tie bar 22.

In this example, the second shoulder block 14b which is connected by the third middle tie bar 23c is not connected by the second middle tie bar 23b in order to avoid an excessive concentration of load on the second shoulder block 14b.

In this example, the shoulder tie bars 24 connect between the second shoulder blocks 14b and the adjacent third shoulder blocks 14c so as to increase the circumferential rigidity of the connected second and third shoulder blocks 14b and 14c and thereby to improve the traction performance during cornering. For that purpose, it is preferred that the axial width of the shoulder tie bar 24 gradually increases towards the intended tire rotational direction R.

Shallow Slots

As shown in FIG. 1 and FIG. 2A, it is preferable that the off-center crown blocks 13b are each provided with a shallow slot 16 extending thereacross in the tire circumferential direction passing through the centroid Gb of the off-center crown block 13b concerned.

Figure 5:
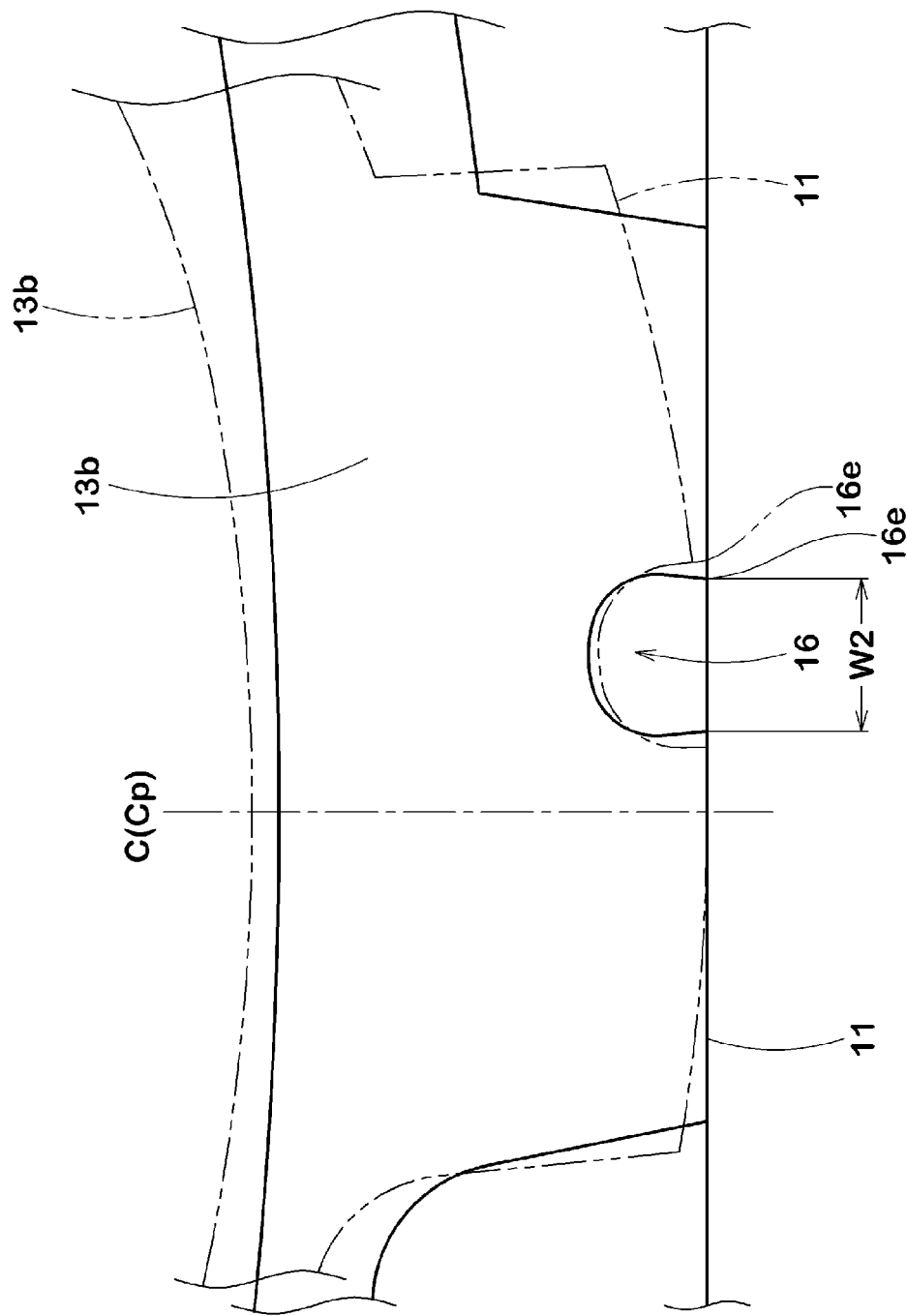
FIG. 5 is an enlarged cross sectional view of a crown block taken along a tire meridian section for explaining a function of a shallow slot.

The depth D2 of the shallow slot 16 is preferably not more than 70%, more preferably not more than 40% of the height D1 of the tread blocks. In this example, specifically, the depth D2 is preferably not more than 10 mm, more preferably not more than 7 mm, but not less than 3 mm, more preferably not less than 5 mm.

since the shallow slot 16 decrease the bending rigidity of the off-center crown block 13b, when contacting with the ground, the off-center crown block can deform as shown in FIG. 5 from a chain double-dashed line to a solid line, and the contact with the ground is increased and thereby the traction performance can be improved. If the width W2 of the shallow slot 16 is too small, it becomes difficult to increase the ground contact. If the width W2 of the shallow slot 16 is too large, as the decrease in the rigidity becomes excessive, it becomes difficult to improve the cornering performance. Therefore, the width W2 of the shallow slot 16 is preferably not less than 5 mm, more preferably not less than 8 mm, but not more than 15 mm, more preferably not more than 10 mm.

Since the axial width of the central crown block 13a is relatively small, the ground contacting top surface 11 is not provided with a slot.

In this example, all of the shallow slots are not crossed by the tire equator.

Narrow Grooves

The first shoulder blocks 14a are each provided on the axially outside of the centroid Gb with a narrow groove 18 extending parallel with the tire circumferential direction in order that the first shoulder blocks 14a are deformed flexibly during cornering and thereby the ground contact is improved.

Modification

Figure 6:
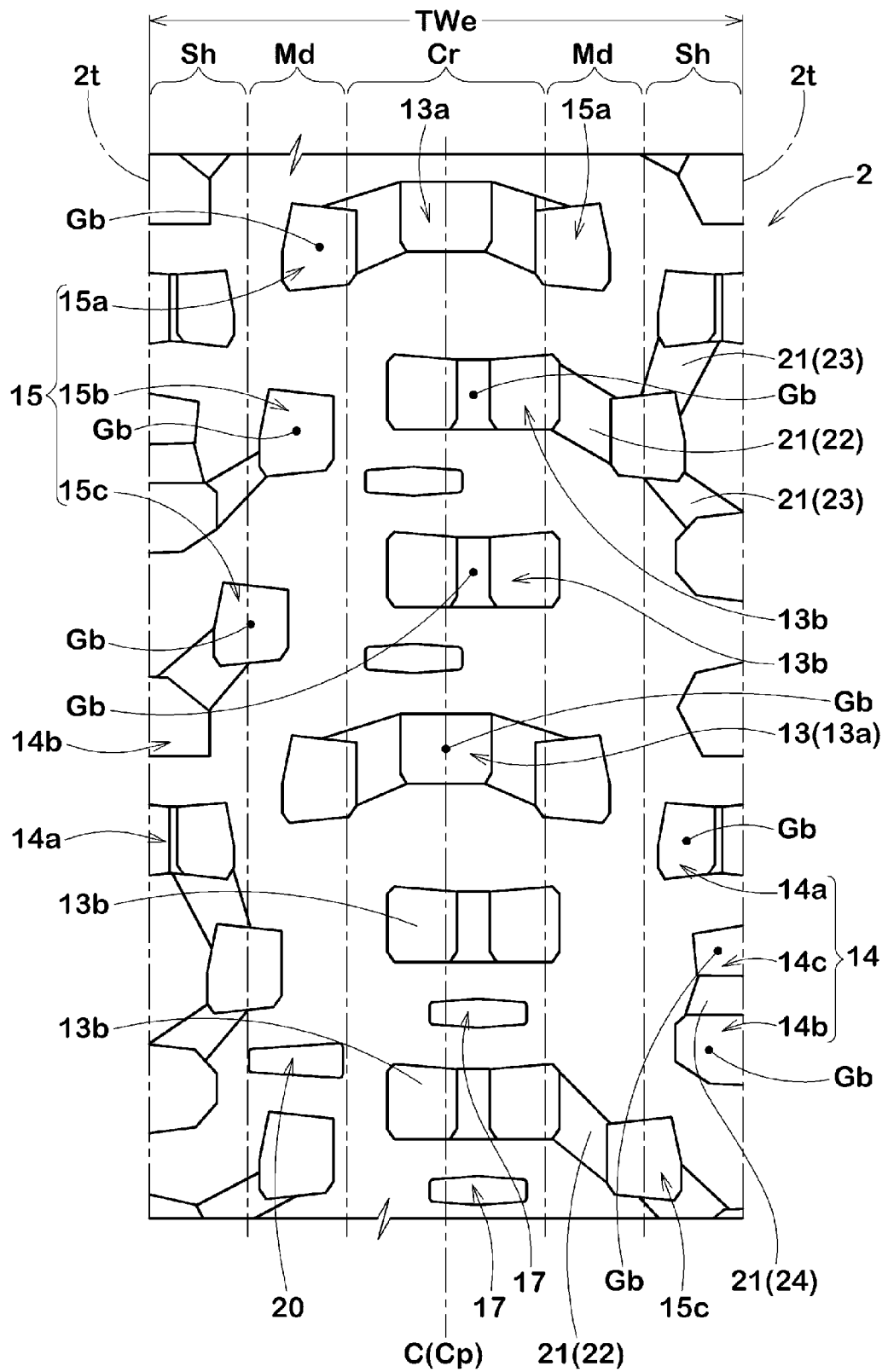
FIG. 6 is a developed partial view of a tread portion according to another embodiment of the present invention.

FIG. 6 shows a tread pattern similar to that shown in FIG. 2A. But, all of the off-center crown blocks 13b are disposed on one side of the tire equator, though, in the tread pattern shown in FIG. 2A, the off-center crown blocks 13b are equally disposed on both sides of the tire equator. This tread pattern is designed for use in such a race course that the percentage of left turns is higher than right turns or vice versa.

Comparison Tests

Based on the internal tire structure shown in FIG. 1 and the tread pattern shown in FIG. 2A, motorcycle tires for front wheel and rear wheel having specifications shown in Table 1 were made and tested as follows.

In a tire test course, 450 cc motorcycle provided on the front and rear wheels with test tires (tire pressure: front=rear=80 kPa) was run on a hard ground, and traction performance during straight running and cornering performance in the initial stage, intermediate stage and end off stage were evaluated by the professional test rider.

The test results are shown in Table 1 by an index based on comparative tire Ref. 1 being 100, wherein the larger the index number, the better the performance.

TABLE 1

| Tire | Ref. 1 | Ref. 2 | Ref. 3 | Ref. 4 | Ref. 5 | Ex. 1 | Ex. 2 |
|---|---|---|---|---|---|---|---|
| Central crown blocks | | | | | | | |
| distance L1 (mm) | 0 | 1.7 | 0 | 0 | 5.09 | 0 | 0 |
| L1/TWe (%) | 0 | 1 | 0 | 0 | 3 | 0 | 0 |
| Off-center crown blocks | | | | | | | |
| distance L2a (mm) | 0 | 1.7 | 13.6 | 3.39 | 6.78 | 6.78 | 10.2 |
| L2a/TWe (%) | 0 | 1 | 8 | 2 | 4 | 4 | 6 |
| distance L2b (mm) | 0 | 1.7 | 13.6 | 3.39 | 6.78 | 6.78 | 10.2 |
| L2b/TWe (%) | 0 | 1 | 8 | 2 | 4 | 4 | 6 |
| maximum axial width W4 (mm) | 49.0 | 49.0 | 49.0 | 49.0 | 49.0 | 49.0 | 49.0 |
| W4/W3 (%) | 188 | 188 | 188 | 188 | 188 | 188 | 188 |
| Shallow slots | without | without | without | without | without | without | without |
| width W2 (mm) | — | — | — | — | — | — | — |
| depth D2 (mm) | — | — | — | — | — | — | — |
| Crown-depressions | with | with | with | with | with | with | with |
| Side-depressions | with | with | with | with | with | with | with |
| Tie bars | with | with | with | with | with | with | with |
| Test results | | | | | | | |
| Traction performance | | | | | | | |
| during straight running | 100 | 100 | 95 | 95 | 90 | 95 | 90 |
| Cornering performance | | | | | | | |
| initial stage | 100 | 100 | 95 | 100 | 100 | 100 | 105 |
| intermediate stage | 100 | 100 | 100 | 100 | 100 | 105 | 105 |
| end off stage | 100 | 100 | 100 | 105 | 100 | 105 | 105 |

| Tire | Ex. 3 | Ex. 4 | Ex. 5 | Ex. 6 | Ex. 7 | Ex. 8 | Ex. 9 |
|---|---|---|---|---|---|---|---|
| Central crown blocks | | | | | | | |
| distance L1 (mm) | 0 | 0 | 0 | 0 | 0 | 0 | 0 |
| L1/TWe (%) | 0 | 0 | 0 | 0 | 0 | 0 | 0 |
| Off-center crown blocks | | | | | | | |
| distance L2a (mm) | 3.39 | 6.78 | 6.78 | 6.78 | 6.78 | 6.78 | 6.78 |
| L2a/TWe (%) | 2 | 4 | 4 | 4 | 4 | 4 | 4 |
| distance L2b (mm) | 6.78 | 10.2 | 6.78 | 6.78 | 6.78 | 6.78 | 6.78 |
| L2b/TWe (%) | 4 | 6 | 4 | 4 | 4 | 4 | 4 |
| maximum axial width W4 (mm) | 49.0 | 49.0 | 49.0 | 49.0 | 49.0 | 49.0 | 49.0 |
| W4/W3 (%) | 188 | 188 | 188 | 188 | 188 | 188 | 188 |
| Shallow slots | without | without | with | with | with | with | with |
| width W2 (mm) | — | — | 3 | 7 | 5 | 7 | 10 |
| depth D2 (mm) | — | — | 5 | 2 | 5 | 5 | 5 |
| Crown-depressions | with | with | with | with | with | with | with |
| Side-depressions | with | with | with | with | with | with | with |
| Tie bars | with | with | with | with | with | with | with |
| Test results | | | | | | | |
| Traction performance | | | | | | | |
| during straight running | 90 | 100 | 97 | 97 | 100 | 100 | 100 |
| Cornering performance | | | | | | | |
| initial stage | 100 | 100 | 100 | 100 | 100 | 100 | 100 |
| intermediate stage | 105 | 105 | 105 | 105 | 105 | 105 | 105 |
| end off stage | 105 | 105 | 105 | 106 | 105 | 105 | 105 |

| Tire | Ex. 10 | Ex. 11 | Ex. 12 | Ex. 13 | Ex. 14 | Ex. 15 |
|---|---|---|---|---|---|---|
| Central crown blocks | | | | | | |
| distance L1 (mm) | 0 | 0 | 0 | 0 | 0 | 0 |
| L1/TWe (%) | 0 | 0 | 0 | 0 | 0 | 0 |

TABLE 1-continued

| Off-center crown blocks | | | | | | |
|---|---|---|---|---|---|---|
| distance L2a (mm) | 6.78 | 6.78 | 6.78 | 6.78 | 6.78 | 6.78 |
| L2a/TWe (%) | 4 | 4 | 4 | 4 | 4 | 4 |
| distance L2b (mm) | 6.78 | 6.78 | 6.78 | 6.78 | 6.78 | 6.78 |
| L2b/TWe (%) | 4 | 4 | 4 | 4 | 4 | 4 |
| maximum axial width W4 (mm) | 49.0 | 49.0 | 49.0 | 39.0 | 52.0 | 49.0 |
| W4/W3 (%) | 188 | 188 | 188 | 150 | 200 | 188 |
| Shallow slots | with | with | with | with | with | with |
| width W2 (mm) | 7 | 7 | 7 | 10 | 10 | 10 |
| depth D2 (mm) | 4 | 7 | 11 | 5 | 5 | 5 |
| Crown-depressions | with | with | with | with | with | with |
| Side-depressions | with | with | with | with | with | without |
| Tie bars | with | with | with | with | with | with |
| Test results | | | | | | |
| Traction performance | | | | | | |
| during straight running | 100 | 100 | 100 | 100 | 102 | 100 |
| Cornering performance | | | | | | |
| initial stage | 100 | 100 | 100 | 100 | 100 | 100 |
| intermediate stage | 105 | 105 | 105 | 102 | 102 | 102 |
| end off stage | 105 | 105 | 105 | 102 | 102 | 102 |

Specifications common to all of the test tires are as follows.
Front wheel
tire size: 90/100-21, rim size: 1.60×21
Rear wheel
tire size: 120/80-19, rim size: 2.15×19
Maximum tire section width TW: 150.0 mm
Developed tread width TWe: 169.5 mm
Land ratio (Sb/S): 20.5%
Block height D1: 16.0 mm
Central crown blocks
maximum circumferential length L3: 20.0 mm
maximum axial width W3: 26.0 mm
total number TLc: 14
Off-center crown blocks
maximum circumferential length L4: 21.5 mm
total number TLs: 28 (TLs/TLc=2)
Middle blocks
maximum axial width W12: 21.0 mm (W12/TWe: 12.4%)
maximum length L12: 23.0 mm (L12/W12: 110%)
innermost middle blocks
distance L9: 35.0 mm (L9/TWe: 20.6%)
in-between middle blocks
distance L10: 42.0 mm (L10/TWe: 24.8%)
outermost middle blocks
distance L11: 56.0 mm (L11/TWe: 33.0%)
First shoulder block:
maximum axial width W6: 24.0 mm (W6/TWe: 14.2%)
maximum length L6: 20.5 mm (L6/W6: 85.4%)
Second shoulder block 14b:
maximum axial width W7: 19.0 mm (W7/TWe: 11.2%)
maximum length L7: 18.0 mm (L7/W7: 94.7%)
Third shoulder block 14c:
maximum axial width W8: 14.0 mm (W8/TWe: 8.26%)
maximum length L8: 13.0 mm (L8/W8: 92.9%)
Tie bar:
height H1: 3.0 mm
Crown and side depressions:
maximum depth D3: 0.5 mm
maximum axial width W5: 30.0 mm (W5/TWe: 17.7%)
maximum length L5: 10.0 mm (L5/W5: 33.3%)
From the test results, it was confirmed that the tires according to the present invention can be improved in the cornering performance while maintaining the traction performance during straight running.

while preferred embodiments of the invention has been described using specific terms, such description is for illustrative purposes only, and it is to be understood that changes and variations may be made without departing from the scope of the following claims.

The invention claimed is:

1. A motorcycle tire comprising
a tread portion having a developed tread width and provided with tread blocks defining a sea area therearound,
the tread blocks including a plurality of crown blocks defined as having a ground contacting top surface whose centroid is located within a crown region defined as having a developed width of ⅓ of the developed tread width and centered on the tire equator, shoulder blocks disposed along each of tread edges, and middle blocks disposed between the shoulder blocks and the crown blocks, wherein
the crown blocks include
a plurality of central crown blocks whose axial distance from the tire equator to the centroid is not more than 2% of the developed tread width, and
a plurality of off-center crown blocks whose axial distance from the tire equator to the centroid is more than 2% and not more than 6% of the developed tread width,
and wherein
said tread blocks include plural sets of a middle block, a first shoulder block and a second shoulder block circumferentially adjacent to the first shoulder block, which are connected through a shoulder tie bar and a middle tie bar such that the shoulder tie bar extends toward one circumferential direction opposite to the intended tire rotational direction from the first shoulder block to the second shoulder block, and the middle tie bar extends obliquely toward said one circumferential direction and toward the axially inside from the first shoulder block to the middle block.

2. The motorcycle tire according to claim 1, wherein the total number of the off-center crown blocks is more than the total number of the central crown blocks.

3. The motorcycle tire according to claim 1 or 2, wherein the maximum axial widths of the off-center crown blocks are more than the maximum axial widths of the central crown blocks.

4. The motorcycle tire according to claim 1, wherein the off-center crown blocks are provided with shallow slots extending in the tire circumferential direction and having a depth of 3 to 10 mm and a width of 5 to 15 mm.

5. The motorcycle tire according to claim 1, wherein
the bottom of the sea area is provided with depressions positioned between the circumferentially adjacent crown blocks, and
the depressions include depressions each disposed adjacently to the off-center crown block and having an opening shape whose centroid is located on the same side of the tire equator as the centroid of the off-center crown block.

6. The motorcycle tire according to claim 1, wherein said off-center crown blocks are connected with the axially outwardly located middle blocks through tie bars.

7. The motorcycle tire according to claim 6, wherein the central crown blocks are connected with the middle blocks through tie bars.

8. The motorcycle tire according to claim 1, wherein the off-center crown blocks include pairs of off-center crown blocks which are circumferentially adjacent to each other and of which two centroids are respectively disposed on both sides of the tire equator.

9. The motorcycle tire according to claim 1, wherein the number of the central crown blocks is equal to the number of the off-center crown blocks disposed on one side of the tire equator which is equal to the number of the off-center crown blocks disposed on the other side of the tire equator.

10. The motorcycle tire according to claim 9, wherein the off-center crown blocks disposed on one side of the tire equator and the off-center crown blocks disposed on the other side of the tire equator are disposed at the same axial distance from the tire equator.

11. The motorcycle tire according to claim 10, wherein
each said central crown block is connected to two of the middle blocks disposed one on each side of the central crown block through two tie bars
inclining to one circumferential direction, and
each said off-center crown block is connected to one of the middle blocks disposed on the same side of the tire equator as the off-center crown block through one tie bar inclining to said one circumferential direction.

12. A motorcycle tire comprising
a tread portion having a developed tread width and provided with a plurality of tread blocks defining a sea area therearound,
the tread blocks including
crown blocks defined as having a ground contacting top surface whose centroid is located within a crown region defined as having a developed width of ⅓ of the developed tread width and centered on the tire equator,
shoulder blocks disposed along each of tread edges, and
middle blocks disposed between the shoulder blocks and the crown blocks, wherein the crown blocks include
a plurality of central crown blocks whose axial distance from the tire equator to the centroid is not more than 2% of the developed tread width, and
a plurality of off-center crown blocks whose axial distance from the tire equator to the centroid is more than 2% and not more than 6% of the developed tread width, and
all of the off-center crown blocks are disposed on one side of the tire equator.

13. The motorcycle tire according to claim 1, wherein the shoulder tie bar is gradually increased in the axial width towards the intended tire rotational direction.

14. The motorcycle tire according to claim 1, wherein said tread blocks include plural sets of a third shoulder block and a second middle block which are connected through a second middle tie bar such that the second middle tie bar extends obliquely toward said one circumferential direction and toward the axially inside from the third shoulder block to the second middle block.

15. The motorcycle tire according to claim 1, wherein said tread blocks include plural sets of a fourth shoulder block, a third middle block and an off-center crown block which are connected through a third middle tie bar and a crown tie bar such that the third middle tie bar extends obliquely toward said one circumferential direction and toward the axially inside from the fourth shoulder block to the third middle block, and the crown tie bar extends obliquely toward said one circumferential direction and toward the axially inside from the third middle block to the off-center crown block.

16. The motorcycle tire according to claim 1, wherein said tread blocks include plural sets of a central crown block and two fourth middle blocks disposed one on each side of the tire equator which are connected through two second crown tie bars such that the two second crown tie bars extend obliquely toward said one circumferential direction and toward the axially inside from the respective fourth middle blocks to the central crown block.

17. The motorcycle tire according to claim 1, wherein the off-center crown blocks are each provided with a shallow slot having a depth of not more than 70% of the height of the block and extending thereacross in the tire circumferential direction passing through the centroid of the block, whereas each of the central crown blocks is not provided with a shallow slot.

* * * * *